United States Patent [19]

Bishop, Jr. et al.

[11] Patent Number: 4,827,136
[45] Date of Patent: May 2, 1989

[54] CASSETTE HAVING PHOTOSTIMULABLE LUMINESCENT SUBSTRATE

[76] Inventors: Gerald L. Bishop, Jr., 43414 Newport Dr., Fremont, Calif. 94538; Robert W. Bogart, 407 Roberts Rd., Pacifica, Calif. 94044; Lawrence L. Kader, 1721A Marshall Ct., Los Altos, Calif. 94022

[21] Appl. No.: 126,046

[22] Filed: Nov. 27, 1987

[51] Int. Cl.⁴ .............................................. G03B 42/04
[52] U.S. Cl. ..................................... 250/484.1; 378/182
[58] Field of Search ................. 250/484.1 B, 484.1 R, 250/483.1, 327.2 A; 378/182, 181

[56] References Cited

U.S. PATENT DOCUMENTS 3,859,527  1/1975  Luckey .......................... 250/327.2

FOREIGN PATENT DOCUMENTS 220629  5/1987  European Pat. Off. ....... 250/327.2 J
1087361 2/1955  France ............................ 378/182

Primary Examiner—Janice A. Howell
Assistant Examiner—Constantine Hannaher
Attorney, Agent, or Firm—Townsend and Townsend

[57] ABSTRACT

A cassette includes a hollow shell having a drawer on which a photostimulable luminescent (PSL) substrate is attached, such as by adhesive or the like. The drawer is movable into and out of the shell so the substrate can be exposed to x-rays while in the shell but can be scanned with scanning equipment when the drawer is out of the shell.

11 Claims, 1 Drawing Sheet

CASSETTE HAVING PHOTOSTIMULABLE LUMINESCENT SUBSTRATE

The present invention relates generally to techniques and devices for acquiring images for subsequent readout by scanning apparatus and, more particularly, to a cassette for supporting and enclosing a radiation sensitive, photostimulable luminescent substrate which can be exposed with ordinary x-ray beams and then scanned without contacting or wearing the surface of the substrate.

BACKGROUND OF THE INVENTION

Photostimulable luminescent (PSL) technology is used to make x-ray images without film. Such technology is generally disclosed in U.S. Pat. No. 3,859,527 and U.S. Pat. No. RE 31,847. Using this technique, a PSL substrate is used to acquire the x-ray image. The material of the substrate has the property of temporarily storing x-ray energy for later release when stimulated by high intensity visible light or infrared radiation. The material is first completely erased by flooding with visible light to return it to its ground state. Next, it is exposed to x-ray radiation which raises the material to its long term excited state in proportion to the two dimensional variation in the intensity of the x-rays. The image is then read out by scanning with a high intensity visible light beam and then measuring the photostimulated radiation of the PSL material.

PSL substrates are used to make x-ray images with the same x-ray generating equipment as used with conventional photographic film/intensifying screen combinations. In a conventional x-ray examination, the film and intensifying screen are mechanically supported and protected from room light by a cassette of metal or plastic during x-ray exposure. Later, the film is removed from the cassette and photographically developed to produce the x-ray image.

A PSL substrate also requires a cassette so that it can be used with ordinary x-ray equipment. In the past, cassettes similar to those used with x-ray film were modified for use with PSL substrates. After x-ray exposure, the substrates were removed manually and inserted into the scanner apparatus or a special mechanism was required to unload the substrate from the cassette. This technique is described in an article by Sonoda et al. in *Radiology*, Volume 48, pgs. 833–848 (1983). After scanning and erasing, the PSL substrate had to be manually or mechanically loaded back into the cassette. The process of removal of the substrate from the cassette, separate scanning, and reloading back into the cassette involved mechanical wear or damage to the substrate surface. Since the image resulting from the scanning process cannot contain substantial artifacts, even slight scratches in wearing of the surface are important and are the main factor in limiting the useful lifetime of the PSL substrates.

The physical dimensions of the cassette surrounding the PSL substrate are limited by the fact that the cassette must be physically similar to those used with film so that it will fit into the cassette holders built into ordinary x-ray generating and exposing equipment.

Mechanisms for automatically removing and loading PSL substrates from cassettes are difficult to manufacture and use for several reasons. First, the mechanism must be carefully designed so as not to damage the surface of the substrate. Second, since the cassettes come in several sizes, and since they have had to be separated from the substrate during scanning, the mechanism must provide for a separate path for each size so that the substrate and cassette can be reliably sorted and reunited after scanning and erasing. If a new size is introduced, the mechanism must undergo a substantial redesign. Third, since the cassette unloading and loading mechanisms are distinct from the scanner transport mechanisms they must be designed to work together without the possibility of damage to the substrate surface. This greatly complicates the overall design of the scanner.

The cassette must not interfere with the detection of the x-ray image. It should only minimally attenuate the x-rays transmitted through the patient or the object examined before they enter this PSL substrate. The cassette should also be designed so that it can absorb x-rays transmitted through the PSL substrate if scatter from surrounding structures is a problem. The cassette may conversely be designed to not attenuate these transmitted x-rays so that it may be used in x-ray systems where the transmitted x-rays are measured to automatically control the exposure.

SUMMARY OF THE INVENTION

The present invention is directed to a cassette suitable for overcoming the drawbacks described above wherein the cassette includes a hollow shell having a drawer on which a PSL substrate is attached, such as by an adhesive or the like. The drawer is movable into and out of the shell so the substrate can be exposed to x-ray while in the shell but can be scanned with scanning equipment when the drawer is out of the shell.

The primary object of the present invention is to provide a cassette which allows x-ray exposure and later scanning and erasing without touching or wearing of the PSL substrates yet the cassette can be easily reloaded or returned to a state ready for the next x-ray exposure by an automatic mechanism after scanning and erasing.

Another object of the present invention is to provide a cassette of the type described which has the same physical size as ordinary film cassettes so that it is compatible with cassette holders of conventional x-ray equipment.

Another object of the present invention is to provide a cassette of the type described which is easily scanned automatically with scanner transport mechanisms without manual interventions yet the cassette can be of different sizes so that it can be easily incorporated in a scanner transport mechanism.

Still another object of the present invention is to provide a cassette which does not significantly attenuate x-rays incident on the PSL substrate mounted in the cassette and scatter absorbing layers can be optionally incorporated within the cassette itself.

Other objects of the this invention will become apparent as the following specification progresses, reference being had to the accompanying drawings for an illustration of the invention.

IN THE DRAWINGS

Figure 1:
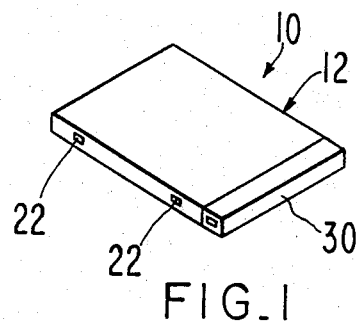
FIG. 1 is a perspective view of the cassette in its closed condition.
Figure 2:
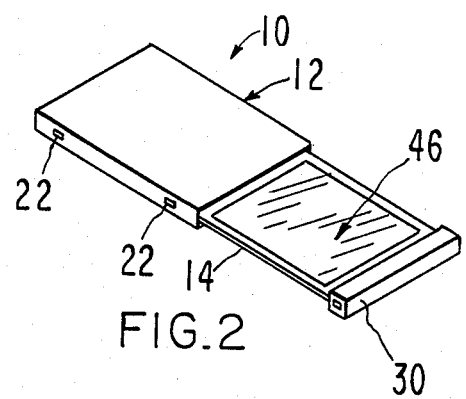
FIG. 2 is a view similar to FIG. 1 but showing the cassette in its opened condition.

The cassette of the present invention is broadly denoted by the numeral 10 and includes a shell 12 which is hollow and is of typically a generally rectangular configuration. The cassette is closed at one and is open at the other end to receive a panel or plate 14 which comprises a drawer which is mounted for movement into and out of the shell as shown in FIGS. 1 and 2.

Shell 12 has a pair of side walls 16 and 18. Side 16 is of a material which has a high x-ray attenuation and side 18 has a low x-ray attenuation. Thus, x-rays can easily penetrate the shell 12 through side wall 18 but cannot exit easily from the shell through wall 16.

Shell 12 has a pair of end walls 20 (FIG. 3) with each end wall 20 having supports 22 which can be gripped by a corresponding mechanism on a scanner transport when the cassette is used in a scanning mode.

Panel 14 has an end 24 within the shell 12 and the end has stops 26 which engages roller 28 rotatably mounted by pins on the side walls 20 near open end 15 (FIG. 3) the rollers also serve to guide panel 14 as its moves into and out of shell 12.

Figure 4:
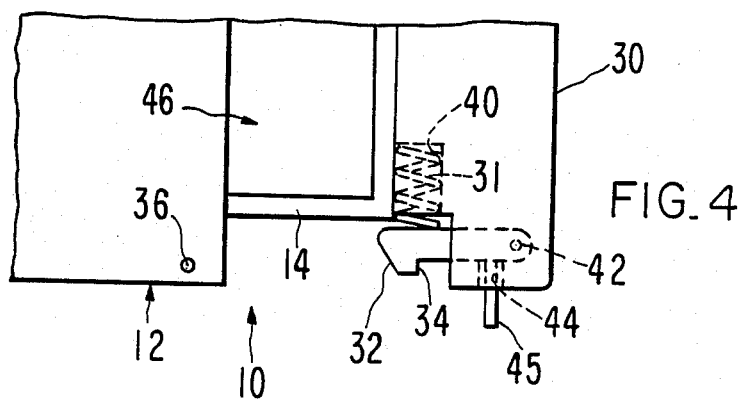
FIG. 4 is an enlarged, fragmentary, top plan view of the cassette in its open condition.

Panel 14 has a stop bar 30 on the outer end thereof as shown in FIGS. 2 and 4. Bars 30 has a latch pawl 32 provided with a shoulder 34 for engaging a pin 36 on shell 12. A coil spring 38 is mounted in the recess 40 in guide bar 30 to bias the latch pawl 32 in a counter clockwise sense when viewing FIG. 4 about a pin 42. A recess 44 is adapted to receive a pin 46 to unlock the pawl and allow the bar 30 to be grasped and panel 14 pulled outwardly into its open condition as shown in FIG. 2.

Figure 3:
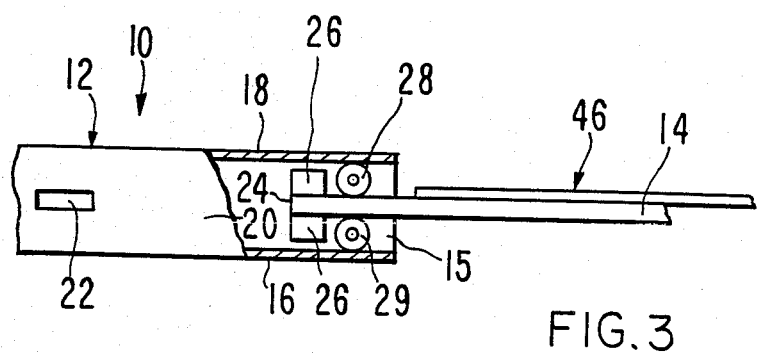
FIG. 3 is an enlarged, fragmentary cross-sectional view of the cassette in its open position.

A photo stimulable luminescent substrate 46 is secured in any suitable manner, such as an adhesive layer 48 to the upper side face of panel 14 as shown in FIGS. 2 and 3. The substrate is typically of a size slightly less than that of panel 14 so that the substrate will cover substantially all of the upper face of the panel.

The operation of the cassette is as follows:

Shell 12 blocks room light and protects and supports substrate 44 mounted on panel 14. The panel 14 fits inside shell 12 and rigidly supports the substrate inside shell during x-ray exposure while allowing the substrate to be transported outside the shell during the scanning process.

Shell 12 contains supports 22 which can be gripped by a corresponding scanning mechanism on the scanner transport to unlock the drawer from the shell and provide a secure support for a precise, jitter-free motion during the scanning process.

The panel 14 is moved inside shell 12 and locked by pawl 32 engaging pin 36 (FIG. 4) in preparation for the x-ray exposure. Rollers 28 (FIG. 3) within shell 12 keep panel 14 rigidly fixed within the shell while the cassette is being moved and placed in the holder on the x-ray examination equipment. After exposure to x-rays, the cassette is placed in the scanner. The scanner transport automatically grips the end bar 30 on panel 14 so that, when a pin 46 is inserted into recess 44, pawl 32 is moved so that the pawl clears pin 36. This releases panel 14 and a transport translates it with respect to shell 12 until the panel is stopped by stops 26 (FIG. 3) and the substrate 44 is outside shell 12.

The transport then moves the entire open cassette so that the PSL substrate is moved across the scanning plane in a first direction. The scanner focus light beam can then be swept in the orthogonal direction so that the light beam sweeps across the substrate surface in a raster.

Keeping the shell 12 and panel 14 connected together during scanning has several important advantages. First there is no need to sort cassettes and substrates after scanning to reload the cassette. Second, it is easy to accommodate different size cassettes by having two clamps, one fixed and one movable to adjust for different widths.

After all of the substrate 44 has been scanned, the transport mechanism moves the cassette to an area of the scanner where the substrate is flooded with visible light to return all the PSL material to its ground state in preparation for the next x-ray exposure. After this process, the transport mechanism moves the shell 12 with respect to panel 14 so that the substrate is enclosed within shell 12 and releases the guide bar 30 to lock it with respect to shell 12. The cassette is then ready for the next x-ray exposure.

The wall 16 of shell 12 may contain a material which is highly x-ray attenuating, such as lead, to minimize the effect of x-rays scattered by materials of the cassette holder on the radiation detected by the PSL material. Wall 18 is made of a low x-ray attenuating material, such as a thin aluminum or carbon fiber sheet to interfere minimally with the x-rays to be detected by the PSL substrate.

We claim:

1. An x-ray cassette comprising:
   a shell having an open end, the shell having a pair of opposed sides, at least one of the sides being permeable to x-rays;
   a panel;
   roller means mounting the panel for movement into and partially out of the shell through the open end thereof, said panel having a surface for supporting a photostimulable luminescent substrate such that x-rays entering the shell through said one side can strike a substrate on said surface; and
   stop means engagable with the roller means for limiting the movement of the panel out of the shell.

2. A cassette as set forth in claim 1, wherein the shell has a pair of opposed sides, one of the sides being more permeable to x-rays than the other side.

3. A cassette as set forth in claim 1, wherein the shell has a pair of opposed parallel sides, said panel being movable into the space between the sides and being generally parallel therewith.

4. A cassette as set forth in claim 1, wherein said mounting means includes a number of rollers rotatably mounted on the shell near the open end thereof, said panel having opposed marginal edges in rolling relationship to the rollers.

5. A cassette as set forth in claim 1, wherein is included means on the outer end of the panel for forming a guide therefor.

6. A cassette as set forth in claim 5, wherein said guide means includes a guide bar rigidly secured to the outer end of the panel.

7. A cassette as set forth in claim 1, wherein is included a photostimulable luminescent substrate, and means for coupling the substrate to said surface of the panel.

8. An x-ray cassette comprising:
   a shell having an open end;
   a panel;
   means mounting the panel for movement into and partially out of the shell through the open end thereof, said panel having a surface supporting a photostimulable luminescent substrate, said mounting means including a number of rollers rotatably mounted on the shell near the open end thereof, said panel having opposed marginal edges in rolling relationship to the rollers; and means on the panel for engaging the rollers to limit the movement of the panel out of the shell.

9. An x-ray cassette comprising:

a shell having an open end;

a panel;

means mounting the panel for movement into and out of the shell through the open end thereof, said panel having a surface for supporting a photostimulable luminescent substrate;

a guide bar rigidly secured to the outer end of the panel; and means on the guide bar for releasably latching the same to the shell.

10. A cassette as set forth in claim 9, wherein said latch means includes a latching pawl pivotally mounted on the guide bar and having a shoulder, there being a pin on the shell for engaging the shoulder of the latch pawl.

11. A cassette as set forth in claim 10, wherein said pawl is biased in the direction towards said pin.

* * * * *